(12) United States Patent
Goodman et al.

(10) Patent No.: US 11,647,062 B2
(45) Date of Patent: May 9, 2023

(54) SYSTEM AND METHOD FOR SOCIALLY CONNECTING PEOPLE USING MUSICAL TASTES AND AUDIO LIVESTREAMS

(71) Applicant: Vestr Inc, Tuscaloosa, AL (US)

(72) Inventors: Sean Goodman, Huntsville, AL (US); Ryan Burns, Dallas, GA (US)

(73) Assignee: Vestr Inc, Tuscaloosa, AL (US)

(*) Notice: Subject to any disclaimer, the term of this patent is extended or adjusted under 35 U.S.C. 154(b) by 0 days.

(21) Appl. No.: 17/162,965

(22) Filed: Jan. 29, 2021

(65) Prior Publication Data
US 2021/0297470 A1 Sep. 23, 2021

Related U.S. Application Data

(60) Provisional application No. 62/992,562, filed on Mar. 20, 2020.

(51) Int. Cl.
| | |
|---|---|
| H04L 29/06 | (2006.01) |
| H04L 65/611 | (2022.01) |
| G06F 16/9535 | (2019.01) |
| G06F 16/687 | (2019.01) |
| G06F 16/64 | (2019.01) |
| G06Q 50/00 | (2012.01) |

(52) U.S. Cl.
CPC ............ *H04L 65/611* (2022.05); *G06F 16/64* (2019.01); *G06F 16/687* (2019.01); *G06F 16/9535* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 2017/0124664 A1* | 5/2017 | Savenok | H04L 67/1074 |
| 2017/0142462 A1* | 5/2017 | Uhrich | H04N 21/4826 |
| 2017/0289202 A1* | 10/2017 | Krasadakis | H04L 67/06 |
| 2019/0132275 A1* | 5/2019 | Kelly | H04L 65/611 |
| 2019/0208002 A1* | 7/2019 | Systrom | H04L 67/12 |
| 2021/0044640 A1* | 2/2021 | He | G10L 15/26 |

FOREIGN PATENT DOCUMENTS

CN 110063060 A * 7/2019 ............ G06F 16/78

* cited by examiner

*Primary Examiner* — Natisha D Cox
(74) *Attorney, Agent, or Firm* — Adams IP, LLC; James Adams; Edward Garner

(57) ABSTRACT

A system and method that determines the musical tastes of a plurality of users and subsequently socially connects said plurality of users using said musical tastes is provided. The system also allows a first user to livestream a single audio data source in way such that a plurality of secondary users may access said single audio data source over a network. This may be accomplished by allowing host user to stream music by selecting audio data associated with their user profile via the user interface. The host user may then select a function of the user interface that instructs the system to livestream the audio data over a network. Guest users may access the livestream using functions of the user interface of the system, and the audio data may be presented to the guest users via a display.

19 Claims, 7 Drawing Sheets

SYSTEM AND METHOD FOR SOCIALLY CONNECTING PEOPLE USING MUSICAL TASTES AND AUDIO LIVESTREAMS

CROSS REFERENCES

This application claims the benefit of U.S. Provisional Application No. 62/992,562, filed on Mar. 20, 2020, which application is incorporated herein by reference.

FIELD OF THE DISCLOSURE

The subject matter of the present disclosure refers generally to a system and method that determines the musical tastes of a plurality of users and subsequently socially connects said plurality of users using said musical tastes.

BACKGROUND

The music streaming market is saturated with streaming services offering similar products that don't encourage user traction to a specific brand. Currently, no streaming service has a feature that allows a user to live stream a single audio data source associated with their user profile with their friends as well as facilitate social interactions between the users based on the musical tastes of its users. The lack of these features not only reduces the number of potential subscribers a streaming service may be able to acquire but also limits the amount of subscriber retention since there are no features of the service that a user may become emotionally invested in. Further, by not offering features that promote social interaction, the music streaming industry is missing out on massive amounts of data that they otherwise may be able to repurpose for research and/or financial gain. Additionally, not allowing users of music platforms to share music reduces the chance upcoming artists may be discovered since upcoming artists are unable self-promote their music. This is a lost royalty opportunity and/or exclusivity agreement that music streaming services may otherwise be able to take advantage of for the benefit of both parties.

Accordingly, there is a need in the art for a system and method that allows individuals to livestream audio data they are listening to in a way that encourages social interaction.

DESCRIPTION

A system and method for connecting users using their interests in music is provided. In one aspect, the system allows a first user to livestream a single audio data source hosted by said first user in way such that a plurality of secondary users may access said single audio data source over a network is provided. In another aspect, the system and method allow users to listen to what other users may be listening to. In yet another aspect, the system and method use social media to help users explore musical genres that may be outside their current musical interests. Generally, the system and method of the present disclosure are designed facilitate social interactions using users' musical interests based off of user data and audio data within said users' user profiles. The system generally comprises a computing entity having a user interface, a processor operably connected to said computing entity, a database connected to said computing entity and processor via a network and having personal data stored thereon, and a non-transitory computer-readable medium having instructions stored thereon, wherein said instructions instruct the processor to perform a specific task or group of tasks that allows users to livestream audio data of other users. In some instances, the processor may be operably connected to the database via one or more servers interconnected between the processor and the database.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of allowing users to share audio data and personal data in a way that promotes social interaction.

Figure 1:
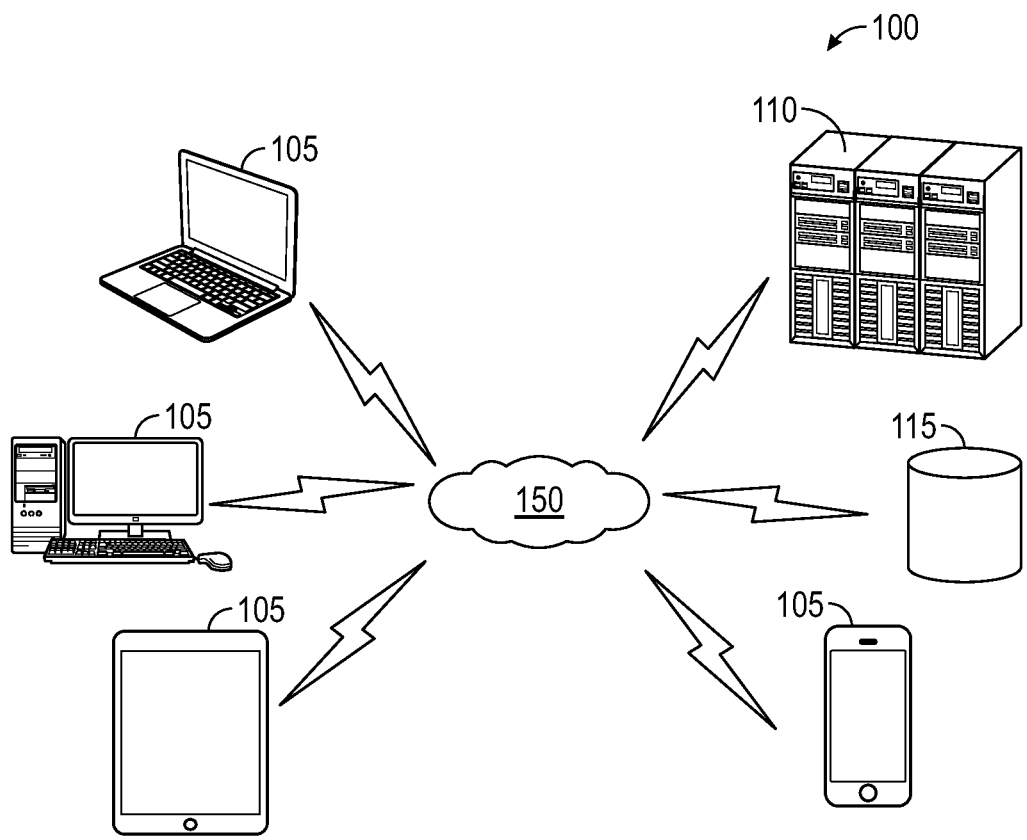
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
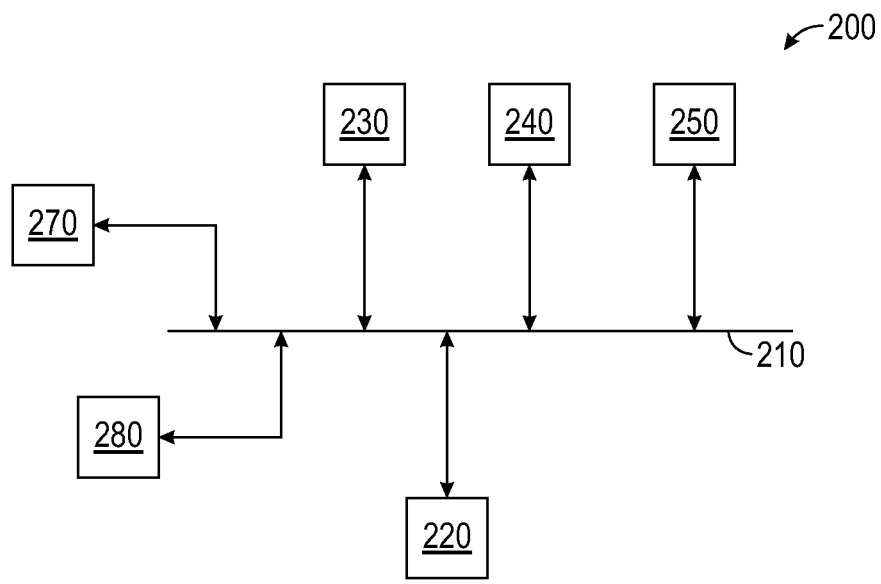
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 411, applications run by a computing entity 200, and wireless communication by a communication interface 280 of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers 110, mainframes, cellular telephones, tablet computers, smart televisions, streaming devices, or any other similar device. Accordingly, the inventive subject matter disclosed herein, in full or in part, may be implemented or utilized in devices including, but are not limited to, laptops, desktops, workstations, personal digital assistants, servers 110, mainframes, cellular telephones, tablet computers, smart televisions, streaming devices, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a streaming device may transfer data to a smartphone, wherein the smartphone may use that data in a manner separate from the streaming device.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
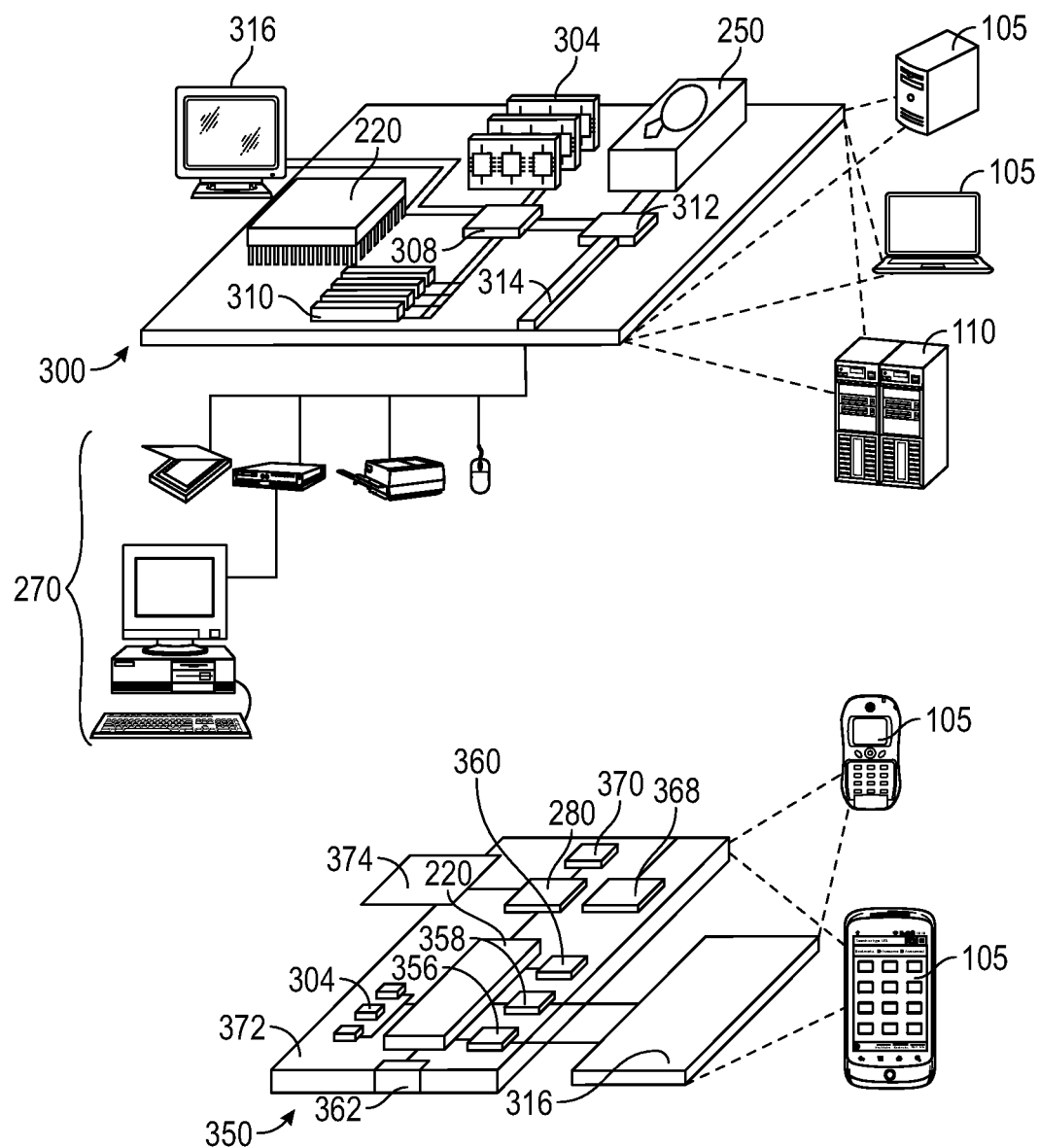
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 411, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. For instance, the power supply may be a stationary power outlet that supplies power via a cable extending from the stationary power outlet to the system 400. For instance, the power supply may be a battery that stores power within and feeds said power directly to the system 400. The system 400 may also comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when it is not connected to a stationary power outlet or if the stationary power outlet ceases to provide power to the computing entity 200.

Figure 4:
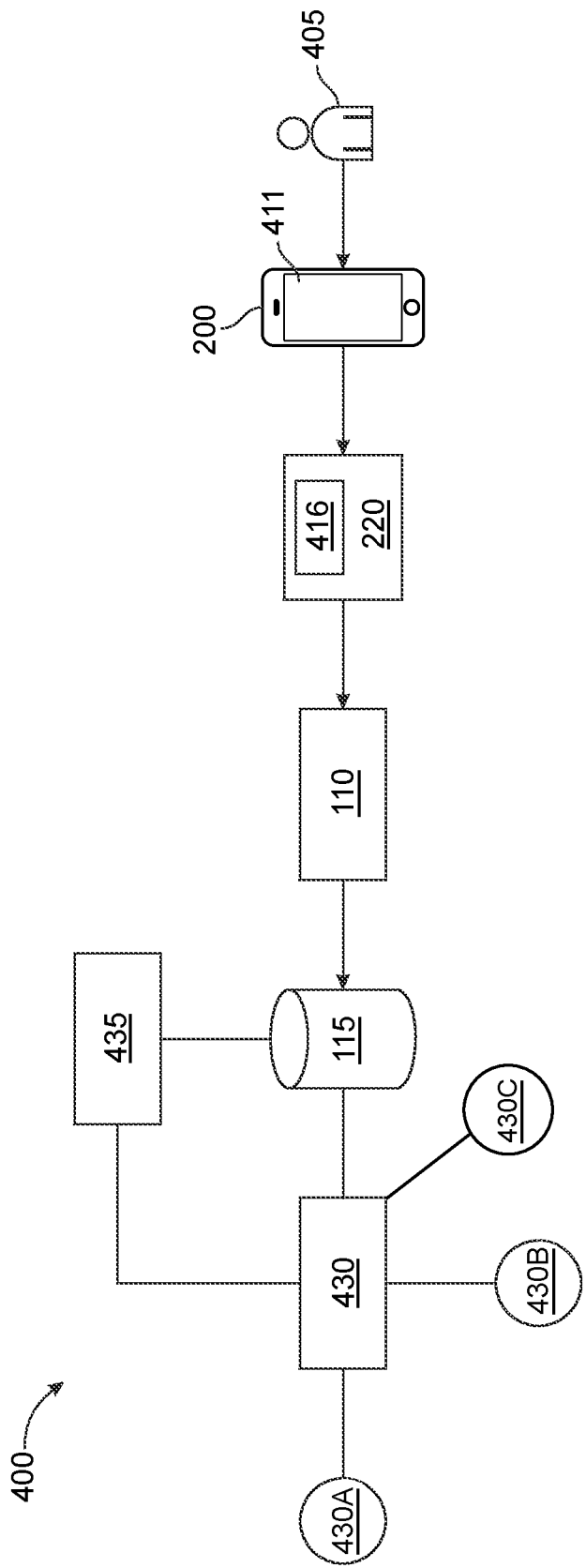
FIG. 4 is a diagram of an example environment in which techniques described herein may be implemented.
Figure 5:
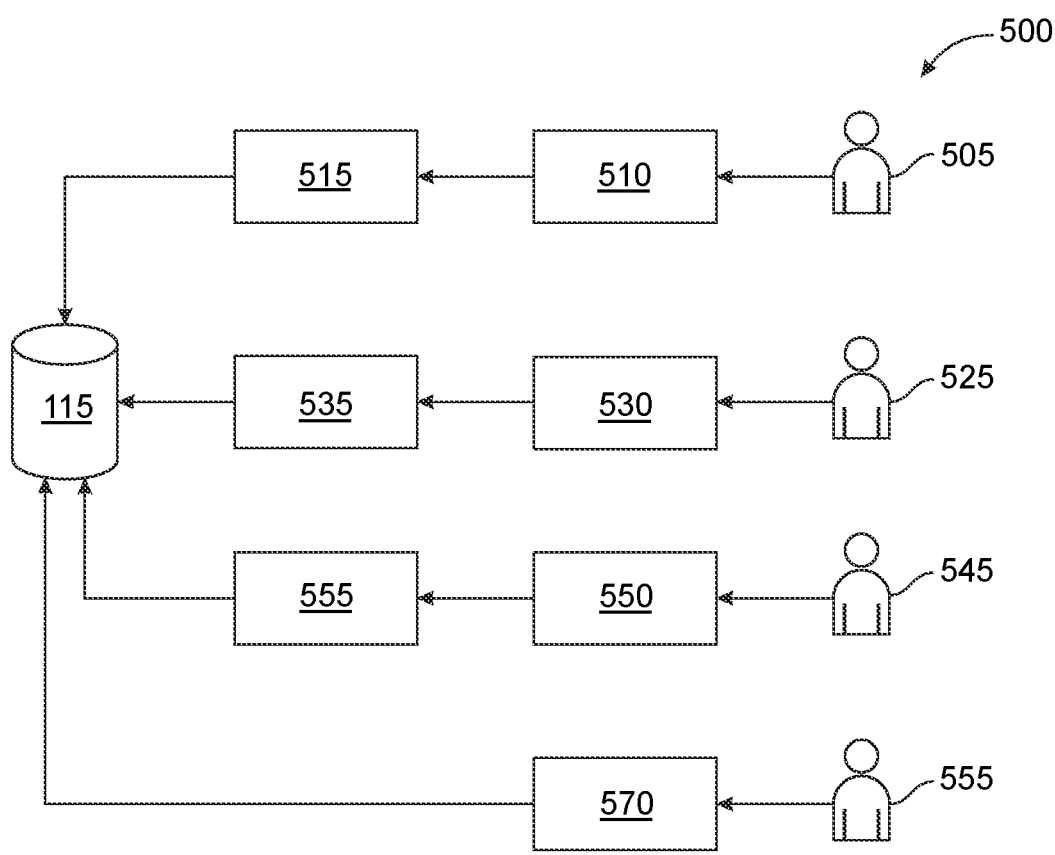
FIG. 5 is a diagram illustrating the manner in which individual access to data may be granted or limited based on user or administrator roles.
Figure 6:
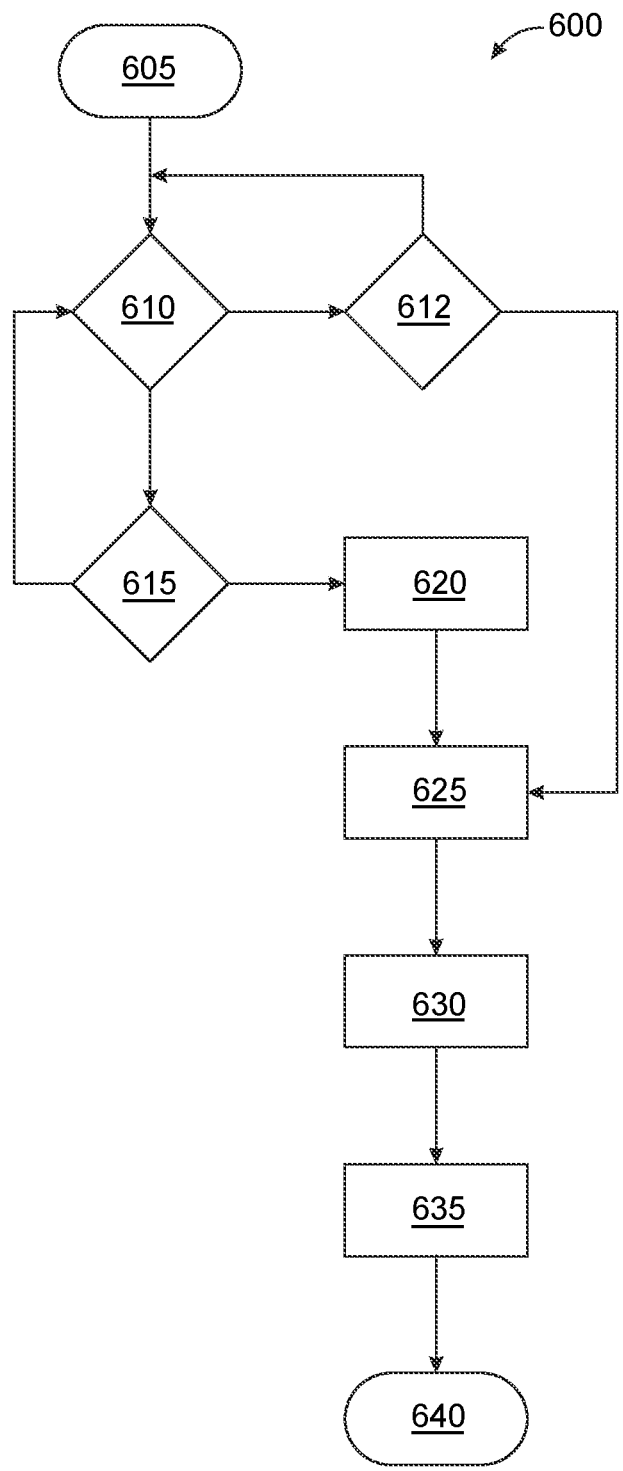
FIG. 6 is a flow chart illustrating certain method steps of a method embodying features consistent with the principles of the present disclosure.
Figure 7:
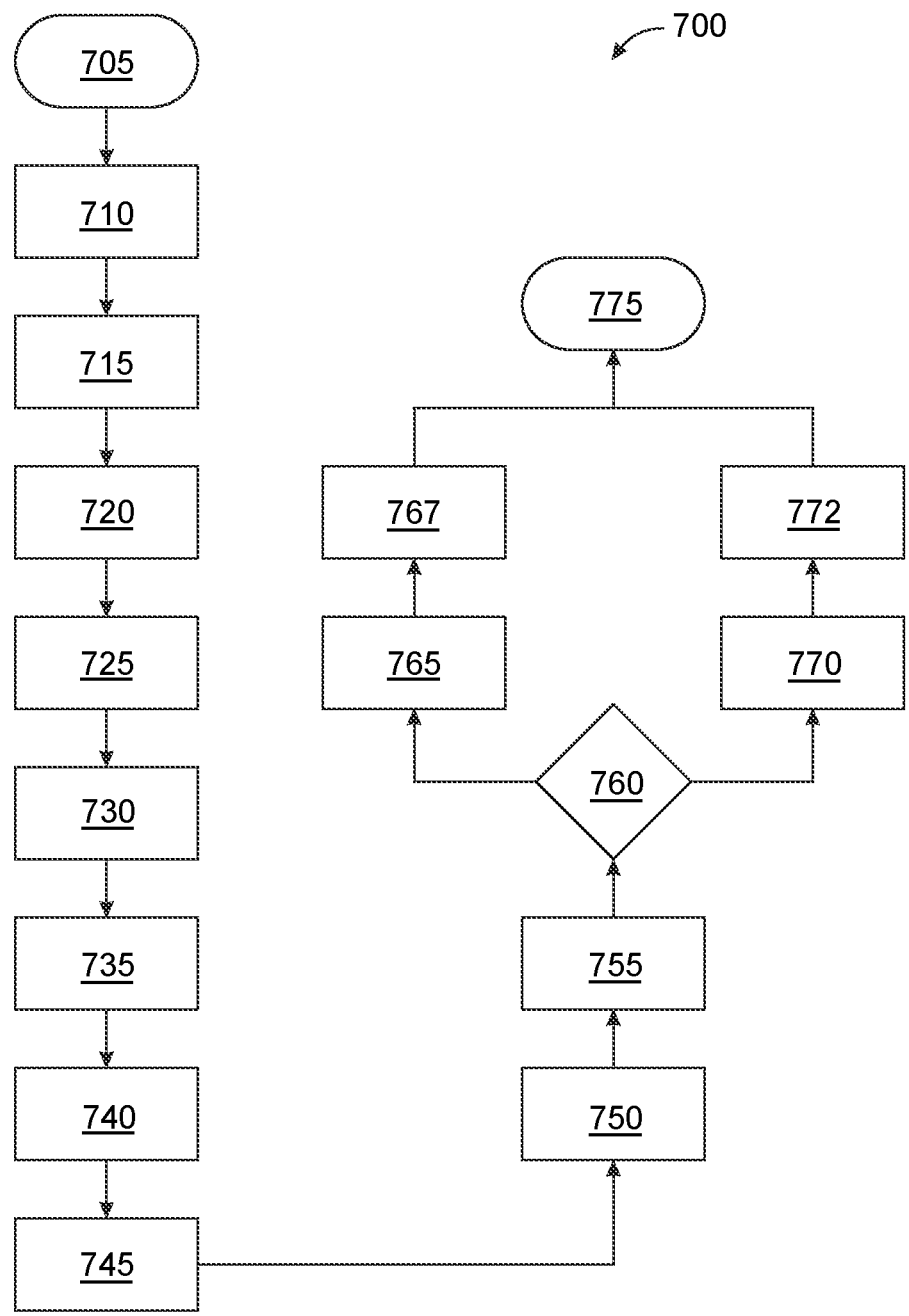
FIG. 7 is a flow chart illustrating certain method steps of a method embodying features consistent with the principles of the present disclosure.
Figure 8:
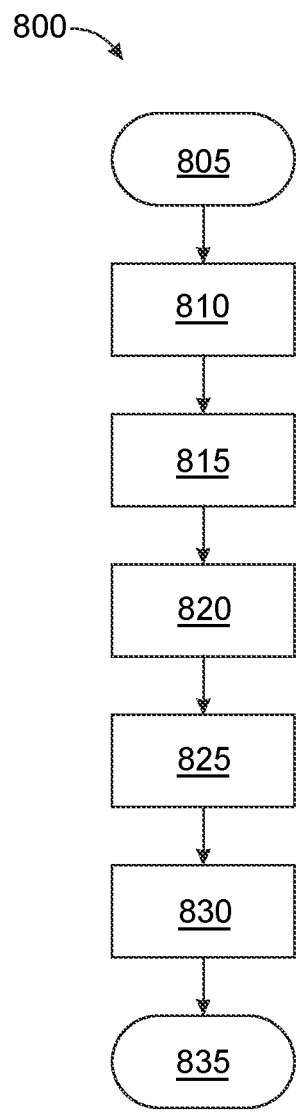
FIG. 8 is a flow chart illustrating certain method steps of a method embodying features consistent with the principles of the present disclosure.

FIGS. 4-9 illustrate embodiments of a system 400 and its various methods for livestreaming audio data 430B between two or more individuals. As illustrated in FIG. 4, the system 400 generally comprises a computing entity 200 having a user interface 411, a processor 220 operably connected to said computing entity 200, a database 115 connected to said computing entity 200 and processor 220 via a network 150, and a non-transitory computer-readable medium 416 having instructions stored thereon, wherein said instructions instruct the processor 220 to perform a specific task or group of tasks that allow a user 405 of the system 400 to livestream a single audio data source 430B so that it may be shared with other users 405 of the system 400 as well as facilitate social interactions between users 405 based on users' 405 musical interests 430C. The computing entity 200 may be operably connected to the processor 220 in a way such that user content 515, 535, 555 may be transmitted from the computing entity 200 to the processor 220. In some instances, the processor 220 may be operably connected to the database 115 via one or more servers 110 interconnected between the processor 220 and the database 115. In another preferred embodiment, a geolocation device of the computing entity 200 provides geolocation data to the system 400. It is understood that the various method steps associated with the methods of the present disclosure may be carried out as operations by the system 400 shown in FIG. 4. FIG. 5 illustrates permission levels 500 that may be utilized by the present system 400 for controlling access to user content 515, 535, 555 such as personal data 430A and audio data 430B. FIGS. 6-8 illustrate various methods that may be carried out by the system 400.

The computing entity 200 may be used to connect users 405 in a way such that at least one user 405 may listen to audio data 430B being livestreamed by another user 405. In a preferred embodiment, audio data 430B is a single audio data source 430B that a host user may host in a way that allows a plurality of secondary users to access said single audio data source 430B. The plurality of secondary users preferably experiences the single audio data source in the same way that the host user experiences it, meaning that any manipulation of the single audio data source by the host user is experienced by the plurality of secondary users in real time. This real time hosting by the host user may be defined as a livestream. In some preferred embodiments, the plurality of secondary users may access the livestream of the host user based on permissions 500 within the system 400. The host user may set permissions 500 of the livestream in a way that allows the plurality of secondary users to manipulate the single audio data source 430B and, therefore, allows the plurality of secondary audio users to manipulate the experience of the host user.

In another preferred embodiment, the computing entity 200 may be used to input personal data 430A for the creation of user profiles 430. As shown in FIG. 4, personal data 430A may include various types information related to a user's 405 personal life. Types of information that may be represented by personal data 430A may include, but is not limited to, name, height, weight, address, contact information, website, images, videos, artist data, or any combination thereof. The type of personal data 430A input via the user interface 411 of the computing entity 200 may depend on the type of social media employed. For instance, a user profile 430 having personal data 430A displayed via an associated web page may convey a user's 405 name, contact information, website, and images of the user 405. For instance, a user profile 430 having personal data 430A displayed in a sequential manner (as directed by said user 405 to tell a story) may convey a user's 405 experiences via images, wherein selecting an image within the user interface 411 will allow a user 405 to listen to audio data 430B paired with said image. For instance, a user profile 430 having personal data 430A displayed as a collage of album art may convey artist data of the user 405, wherein the collage may be unique to the user 405 based on musical preference.

Personal data 430A may be uploaded and/or input to the database 115 via the user interface 411 automatically or manually by the user 405. In an embodiment, personal data 430A may be automatically uploaded and stored in the database 115. For instance, an image uploaded by a user 405 may be automatically stored within a database 115. Once the user profile 430 has been created, the processor 220 may save the user profile 430 to the non-transitory computer-readable medium 416. In an embodiment, a plurality of user profiles 430 may be stored within the non-transitory computer-readable medium 416 of the system 400. Alternatively, the system 400 may store the plurality of user profiles 430 within a database 115, wherein each user profile 430 within the plurality of user profiles 430 may contain information specific to a user 405.

In another preferred embodiment, users 405 may access audio data 430B via their computing entity 200. Music data may be stored locally on a non-transitory computer-readable medium 416 or on a database 115 operably connected to the processor 220 of the computing entity 200. When listening to audio data 430B via the user interface 411 of the system 400, the system 400 may create a livestream containing said audio data 430B within. A livestream may be defined as a real-time transmission or broadcast of audio data 430B that may be accessed by others. In a preferred embodiment, users 405 of the system 400 may access the livestreams of other users 405 that are created by the system 400. Users 405 whose computing entity 200 is the host of the livestream may be called host users 405. Users 405 who are accessing the host user's 405 livestream by any means other than the host computing entity 200 may be called guest users 405. In a preferred embodiment, host users 405 may fully control audio data 430B played on their livestream, and guest users 405 may only listen to audio data 430B on said host user's 405 livestream. For instance, a host user 405 playing music on their computing entity 200 via the user interface 411 may play, rewind, fast-forward, pause, skip, etc. any music played, and the livestream created by the system 400 would follow any actions taken by the host user 405. On the other hand, any guest user 405 listening to the host user's 405 livestream would not be able to control the music playing on the host user's 405 computing entity 200. In another preferred embodiment, host users 405 may allow guest users 405 to control music playing on the host user's 405 computing entity 200.

In a preferred embodiment, a machine learning technique may be used to assist with the various functions of the system 400. For instance, pattern recognition or computer-aided detection may be used to facilitate the initial interaction between users 405 having similar music interests. The system 400 may use more than one machine learning technique to determine which users 405 may be interested in interacting. Machine learning techniques may also be used to as assist users 405 in choosing audio files to play. For instance, the system 400 may use supervised deep learning combined with results from computer-aided detection and compound term processing to play audio files without the user 405 having to select them within the user interface 411. Over time, the system 400 may obtain more knowledge and be able to become more useful in assisting users 405 to play audio files that are relevant to a situation automatically. For instance, the system 400 may gather geolocation and chronological data and determine that when the user 405 is at the gym in the morning on Monday, a rap playlist is preferred. However, when the user 405 is home at night on Sunday, Monday, Tuesday, Wednesday, and Thursday, the system 400 may determine a nature sounds playlist is preferred.

The system 400 may use audio data 430B and personal data 430A to create musical interests 430C for a particular user profile 430. Musical interests 430C may be defined as music, events, and activities related to music that a particular user 405 may enjoy and/or has participated in. Categories that may be used to define a user's 405 musical interests 430C include, but are not limited to, musical genres, musical activities, music events, or any combination thereof. Musical interests 430C may be multifaceted based on the musical genres, musical artists, musical activities, and musical events that a user 405 enjoys, performs, and attends, respectively. As such, the system 400 may create a plurality of musical interests 430C as unique as the plurality of users who use the system 400 to socially interact. The system 400 may then use these musical interests 430C to match users 405 and facilitate social interaction between them. For instance, the system 400 may encourage users 405 within a certain geographic region from one another to attend a live music event that matches said users' 405 musical interests 430C.

The system 400 may also use the musical interests 430C of users 405 to recommend musical events or musical genres in way to expand the user's 405 musical interests 430C. In a preferred embodiment, the system 400 compares a first user's musical interests 430C to at least one second user's musical interests 430C, wherein the at least one second user's musical interest 430C meet a minimum threshold. The system may then recommend a musical genre, musical artist, musical activity, or musical event based on any differences between the musical interests 430C of the first user and at least one second user. For instance, the system 400 may recommend that a user 405 go to a local musical event to meet other users having musical interests 430C that are 90% similar to the user's 405 musical interests 430C even though the recommended musical event is not a known musical interest 430C of the user 400. The recommendation would be based on the interests of the other users whose musical interests 430C are 90% similar to the user's 400. This technique may be used by the system 400 as a way to encourage users 405 to experience new musical genres, musical artists, musical activities, and musical events that they otherwise may not have actively looked for on their own, which may positively affect the users' lives by encouraging experimentation.

Musical genres may be defined as classifications of music based on a shared tradition or set of conventions. The system may assign musical genres to a profile based on music played within users' 400 livestreams, musical activities a user 400 enjoys, or musical events that a user 400 has participated. Musical artists may be defined as person who participates in the musical arts. The system may assign musical artists to a profile based on music played within users' 400 livestreams, musical activities a user 400 enjoys, or musical events that a user 400 has participated. Musical activities may be defined as undertakings of a user 400 that in some way have a connection to music, wherein said connection may be implicit or implied. An example of an implicit connection may be to provide a user profile 430 with a musical interest 430C associated with classical piano when the user data 435 of said user profile 400 indicates that the user 405 teaches or is taking classical piano. An example of an implied connection may be to provide a user profile 430 with a musical interest 430C associated with country music when the user data 435 of said user profile 430 indicates that the user 405 participates in the activity of hunting and recently went to a Alan Jackson concert. Musical events may be defined as events that a user 405 has participated in that also have a link to a particular musical genre. For instance, the system 400 may determine that a user 405 enjoys going to electronic music festivals based on live events the user 405 has participated in and subsequently associate the user's 405 user profile 430 with a musical interest 430C of live electronic music. For instance, the system 400 may determine that a user 405 enjoys to frequent a local club that is known to be associated with jazz music and subsequently associate the user's 405 user profile 430 with a musical interest 430C of live jazz music.

Some preferred embodiments of the system 400 may comprise a geolocation device. The geolocation device may be a single component of a larger computing entity 200. In one preferred embodiment, the geolocation device may comprise a plurality of devices working together to obtain a geolocation via triangulation. In a preferred embodiment, the geolocation device is a GPS sensor. The GPS sensor may measure and transmit geospatial data relevant for determining geolocation. A GPS sensor may be defined as a receiver having an antenna designed to communicate with a navigation satellite system 400. Geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a geographic information system (GIS). Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data. In a preferred embodiment, the geolocation device is part of a mobile computing device 350.

As mentioned previously, the system 400 may further comprise a user interface 411.

Personal data 430A and audio data 430B may be presented to the user 405 via the user interface 411. For instance, a user 405 may select a function within the user interface 411 that may allow the user 405 to listen to another user's 405 livestream, wherein the user 405 hosting the livestream is a host user 405 and the user 405 listening to the livestream is a guest user 405. A user interface 411 may be defined as a space where interactions between a user 405 and the system 400 may take place. In an embodiment, the interactions may take place in a way such that a user 405 may control the operations of the system 400. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present personal data 430A and audio data 430B to the user 405 via a display operably connected to the processor 220. A display may be defined as an output device that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 416 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of a livestream containing audio data 430B via a speaker, wherein the hard copy of the audio data 430B is stored within a database 115. Displays may include, but are not limited to, cathode ray tube monitors, LCD monitors, light emitting diode (LED) monitors, gas plasma monitors, screen readers, speech synthesizers, virtual reality headsets, haptic suits, speakers, and scent generating devices, or any combination thereof.

In a preferred embodiment, the instructions may be stored on a non-transitory computer-readable medium 416 that may be coupled to the processor 220, as shown in FIG. 4. Alternatively, the instructions may be stored or included within the processor 220. Examples of non-transitory computer-readable mediums 416 may include, but are not limited to, magnetic media such as hard disks, floppy disks, and magnetic tape; optical media such as CD ROM discs and DVDs; magneto-optical media such as optical discs; and hardware devices that are specially configured to store and perform instructions, such as read-only memory (ROM), random access memory (RAM), or flash memory. The described hardware devices may be configured to act as one or more software modules in order to perform the operations disclosed herein. In another embodiment, user profiles 430 may be stored within the non-transitory computer-readable medium 416 of the system 400 in a way such that personal data 430A and/or audio data 430B may be viewed using the user interface 411.

As shown in FIG. 4, the database 115 is configured to store data relating to user profiles 430 therein, which may include personal data 430A and audio data 430B. The processor 220 may be operably connected to the database 115 via wired or wireless connection. The database 115 may be a relational database such that the personal data 430A and audio data 430B may be stored, at least in part, in one or more tables. Alternatively, the database 115 may be an object database such that the personal data 430A and audio data 430B may be stored, at least in part, as objects. In some instances, the database 115 may comprise a relational and/or object database and a server 110 dedicated solely to managing the personal data 430A and audio data 430B in the manner disclosed herein. As mentioned previously, the server 110 may be operably connected to the processor 220 and the database 115 in a way such that the server 110 may receive the personal data 430A and audio data 430B from the processor 220 and subsequently transfer the personal data 430A and audio data 430B to the database 115. Although represented as a single server 110 in FIG. 4, it is understood that multiple servers 110 may be used to operably connect the processor 220 to the database 115 and/or the content repositories. The processor 220 may be operably connected to the server 110 via wired or wireless connection.

In one preferred embodiment, user profiles 430 may be sorted into groups and subgroups, which may be used to pair users 405 with similar personal data 430A and audio data 430B. In a preferred embodiment music groups 435 may be used by the system 400 to pair users 405 with similar data. A music group 435 may be defined as a group containing data relevant to a particular music genre. For instance, a music group 435 relating to jam bands may contain information pertaining to the listening habits of users 405 who enjoy jam bands. For instance, a music group 435 relating to dubstep may contain information regarding the listening habits of users 405 who enjoy dubstep. A subgroup of a music group 435 may be defined as a group containing data relevant to a particular artist of a music genre. For instance, a sub group of a classic rock music group 435 may contain information regarding the listening habits of users 405 who enjoy a particular classic rock artist. In one preferred embodiment, a music group 435 may comprise of multiple music genres.

In an embodiment, the user interface 411 may be configured in a way such that a user 405 may search for music groups 435 the user 405 may desire to be a part of. For instance, a user 405 who enjoys bluegrass may search for music groups 435 having users 405 who enjoy the bluegrass genre. For instance, user 405 who enjoys a particular musical artist may search for subgroups of a music groups 435 that include said preferred musical artist. In another embodiment, the user interface 411 may be configured to allow a user 405 to pay for the privilege of associating their user profile 430 with a music group 435 or music subgroup via the user interface 411. A user 405 may alter the permission levels 500 needed to access their livestream in a way such that only other user profiles 430 associated with a particular music group 435 may access their livestream. Alternatively, the user interface 411 may be configured to allow a user 405 to purchase music livestreamed from other users 405 so they may be added to the user's 405 audio data 430B. For instance, payment options through the interface may include the option of purchasing via credit card a song livestreamed by another user 405. In some preferred embodiments, host users 405 may charge guest users 405 for access to their livestream.

In another preferred embodiment, a group or subgroup may comprise a shared playlist, wherein each member of the group or subgroup can add songs to the playlist that members (users 405) of that group or subgroup can simulations to livestream. For instance, a subgroup of a reggae group may create a playlist in which only members of the subgroup may add songs and livestream the playlist. The members of the subgroup may change permissions so that all members of the reggae group may add songs and livestream the playlist at a later time even if they do not belong to the subgroup. In one preferred embodiment, a member may limit the types of audio files that may be added to a playlist. For instance, the member may configure the playlist so that only audio files having a specific genre may be added to the playlist. In an alternative embodiment, members of a group or subgroup may contribute audio files of their user profile to a group music pool, wherein said group music pool comprises audio files of each member's user profile within said group. The system 400 may select audio files from the group music pool and create a livestream. In a preferred embodiment, the audio files selected from the group music pool are chosen based on a musical interest 430C of the group and not the individual members of the group. For instance, if the group has a group musical interest 430C of country music, the system 400 will choose audio files of the group music pool in a way such that the majority of audio files chosen align with the musical interests 430C of country music. In another preferred embodiment, the audio files selected from the group music pool are chosen based on shared musical interests 430C of members within the group. For instance, if 80% of members within a group have a musical interest 430C of ballroom music and 20% of members within the group have a musical interests 430C of jazz, the system 400 will choose audio files of the group music pool in a way such that the majority of audio files chosen align with the musical interests 430C of ballroom music.

To prevent an un-authorized user 405 from accessing other user's 405 information and/or to limit who can control the various livestreams within this detailed description, the system 400 may employ a security method. As illustrated in FIG. 5, the security method of the system 400 may comprise a plurality of permission levels 500 that may grant users 405 access to user content 515, 535, 555 within the database 115 while simultaneously denying users 405 without appropriate permission levels 500 the ability to view user content 515, 535, 555. To access the user content 515, 535, 555 stored within the database 115, users 405 may be required to make a request via a user interface 411. Access to the data within the database 115 may be granted or denied by the processor 220 based on verification of a requesting user's 505, 525, 545 permission level 500. If the requesting user's 505, 525, 545 permission level 500 is sufficient, the processor 220 may provide the requesting user 505, 525, 545 access to user content 515, 535, 555 stored within the database 115. Conversely, if the requesting user's 505, 525, 545 permission level 500 is insufficient, the processor 220 may deny the requesting user 505, 525, 545 access to user content 515, 535, 555 stored within the database 115. In an embodiment, permission levels 500 may be based on user roles 510, 530, 550 and administrator roles 570, as illustrated in FIG. 5. User roles 510, 530, 550 allow requesting users 505, 525, 545 to access user content 515, 535, 555 that a user 405 has uploaded and/or otherwise obtained through use of the system 400. Administrator roles 570 allow administrators 565 to access system 400 wide data.

In an embodiment, user roles 510, 530, 550 may be assigned to a user 405 in a way such that a requesting user 505, 525, 545 may view user profiles 430 containing personal data 430A and/or audio data 430B via a user interface 411. To access the data within the database 115, a user 405 may make a user 405 request via the user interface 411 to the processor 220. In an embodiment, the processor 220 may grant or deny the request based on the permission level 500 associated with the requesting user 505, 525, 545. Only users 405 having appropriate user roles 510, 530, 550 or administrator roles 570 may access the data within the user profiles 430. For instance, as illustrated in FIG. 5, requesting user 1 505 has permission to view user 1 content 515 and user 2 content 535 whereas requesting user 2 525 only has permission to view user 2 content 535. Alternatively, user content 515, 535, 555 may be restricted in a way such that a user 405 may only view a limited amount of user content 515, 535, 555. For instance, requesting user 3 545 may be granted a permission level 500 that only allows them to view user 3 content 555 related to their audio data 430B but not user 3 content 555 related to personal data 430A. In the example illustrated in FIG. 5, an administrator 565 may bestow a new permission level 500 on users 405 so that it may grant them greater permissions or lesser permissions. For instance, an administrator 565 may bestow a greater permission level 500 on other users 405 so that they may view user 3's content 555 and/or any other user's content 515, 535, 555. Therefore, the permission levels 500 of the system 400 may be assigned to users 405 in various ways without departing from the inventive subject matter described herein.

FIG. 6 provides a flow chart 600 illustrating certain, preferred method steps that may be used to carry out the method of logging into and out of a user profile 430. Step 605 indicates the beginning of the method. During step 610, a user 405 may choose to create a new user profile 430 or login to an existing user profile 430. When a user 405 chooses to login to an existing profile, the user 405 proceeds to step 612. During step 612, the user 405 may be prompted by the user interface 411 to input their user name and password. If a user 405 inputs a correct user name and password, the user 405 may proceed to step 625. Otherwise, the user interface 411 may return the user 405 to step 610. When a user 405 chooses to create a new user profile 430, the user 405 may be prompted to provide a new user name and a password during step 615. In a preferred embodiment, a user's 405 email address is used for the user name. In another preferred embodiment, a user 405 may be prompted to provide various personal information once the user 405 has input a suitable user name and password. Personal information may include, but is not limited to, the user's 405 legal name, business name, date of birth, personal address, business address, or any other information that might be relevant to identifying a user 405.

When creating a user profile 430, certain fields of information may be required. If these fields are not provided by a user 405, the user 405 may not proceed to the save user profile 430 step 625. Accordingly, in one preferred embodiment, the method of the present disclosure may further comprise a missing field step 620. During step 620, a processor 220 reviews the personal information provided by the user 405 to assess whether all required fields have been inputted. If all required fields have been inputted, the user interface 411 subsequently proceeds to the save user profile 430 step 625. If a user 405 fails to provide one or more required fields, the user interface 411 may prompt the user 405 to input the missing fields of personal information. Required personal information fields may include, but are not limited to, the user's 405 legal name, business name, date of birth, personal address, business address, or a combination thereof, as described herein.

Once all required field are input, a user 405 may proceed to step 625, wherein the processor 220 saves the user profile 430 in the computing entity 200 under the user name provided by the user 405 at the beginning of the create user profile 430 step 610. In one preferred embodiment, the user profile 430 is also saved within a database 115 of the system 400. In another preferred embodiment, the data within the user profile 430 is encrypted before being saved within the computing entity 200 and/or database 115. After a user profile 430 has been created or a user 405 logs into an existing profile, a user 405 may logout of the system 400 by selecting a "Sign Out" function of the user interface 411 during step 630. Once selected, the processor 220 may present the login screen to the user 405 during step 635, and the method may subsequently proceed to the terminate method step 640.

FIG. 7 provides a flow chart 400 illustrating certain, preferred method steps that may be used to carry out the method of searching for other users 405 as well as following/unfollowing said users 405. Step 705 indicates the beginning of the method. During step 710, a user 405 may log into their user profile 430. Once logged in, a user 405 may select an "Explore" function of the user interface 411 during step 715. The processor 220 may then present the user 405 with a search box and the user 405 may input search parameters into the search box during steps 110 and 115, respectively. In a preferred embodiment, a user 405 may input a user name into the search box as a search parameter, but the user 405 may input other search parameters into the search box without departing from the inventive subject matter here in. Types of search parameters that may be input into the search box include, but are not limited to, music genre, group name, artist name, or any combination thereof. In another preferred embodiment, the system 400 may recommend user profiles 430 to users 405 via the interface without the user 405 performing a search. For instance, the system 400 may recommend user profiles 430 having similar musical interest 430C to the user 405. For instance, the system 400 may recommend user profiles 430 to a user 405 similar to user profiles 430 in which a user 405 is viewing.

In some preferred embodiments, the system 400 may search for music groups 435, livestreams, and/or user profiles 430 within a certain geographic range of the user 405. For instance, a user 405 searching for livestreams may input a search parameter that restricts the system 400 to return streams only within a 75-mile radius of the user 405. This may allow a user 405 to search for user profiles 430, streams, and music groups 435 that are more local to said user 405. Once the search parameters are input, the user 405 may instruct the processor 220 to perform a query based on the search parameters during step 730, and the processor 220 may perform the query during step 735. The processor 220 may return the results to the user 405 via the user interface 411 during step 740. In a preferred embodiment, the processor 220 may return user profiles 430 to the user 405 based on the search parameters input into the search box. The user 405 may then examine the results within the user interface 411 during step 745, and subsequently select a user profile 430 during step 750. The user 405 may make a determination as to whether they should follow or unfollow the selected user profile 430 during step 755. Based on the results of the determination, the user 405 may take an action during step 760. If the user 405 decides to follow a user profile 430, the user 405 may select the "Follow" function during step 765, wherein the processor 220 may add the user profile 430 to a list of user profiles 430 the user 405 is following during step 767. If the user 405 decides to unfollow a user profile 430, the user 405 may select a "Unfollow" function of the user interface 411 during step 770, wherein the processor 220 may remove the user profile 430 from a list of user profiles 430 in which the user 405 is following during step 772. Once the processor 220 has either added or removed a user profile 430 from the list of user profiles 430 in which the user 405 is following, the method may proceed to the terminate method step 775.

FIG. 8 provides a flow chart 500 illustrating certain, preferred method steps that may be used to carry out the method of livestreaming audio data 430B. Step 805 indicates the beginning of the method. During step 810 a user 405 may select audio data 430B associated with their user profile 430 via the user interface 411. Once selected, the processor 220 may present the selected data via a display during step 815. In a preferred embodiment, the user interface 411 may display the title, artist, and art associated with the audio file to the user 405 while a speaker presents the audio data 430B to the user 405. Once the processor 220 has started presenting the audio data 430B via the display, the user 405 may select a "Start Livestream" function of the user interface 411 during step 820. The system 400 may then create a livestream containing the presented audio data 430B and make said stream visible to other users 405. Alternatively, a user 405 may select the "Start Livestream" function of the user interface 411 prior to selecting audio data 430B associated with their user profile 430. When a user 405 is finished livestreaming audio files, the user 405 may select the "Stop Streaming" function of the user interface 411 during step 825. The processor 220 may then terminate the stream during step 830, which may give control function back to the guest users' 405 user interfaces 411. The method may then proceed to terminate method step 835.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for socially connecting two or more individuals and expanding musical interests of an individual, comprising, a first computing entity having a user interface and operably connected to a network,
  wherein said user interface allows a respective user to create a live stream using audio data associated with a user profile of said respective user,
  wherein said live stream is associated with said user profile of said respective user,
  wherein said user profile contains a plurality of musical interests of said respective user,
  wherein said plurality of musical interests are assigned to said user profile based on personal data and audio data associated with said user profile,
  wherein said personal data comprises social activities of said respective user,
  wherein said social activities include at least one in-person musical event that said respective user will at least one of attend in-person or has already attended in-person,
  wherein said at least one in-person musical event is an event with a physical location and that is associated with at least one music genre,
  wherein a processor is configured to receive said audio data and create a live stream, a second computing entity having said user interface and operably connected to said network,
  wherein said user interface of said second computing entity presents to a second user a plurality of user profiles,
  wherein a second user profile contains said plurality of musical interests of said second user,
  wherein said plurality of user profiles presented to said second user is based on said plurality of musical interests within said second user profile and said plurality of musical interests within said plurality of user profiles,
  wherein each said user profile of said plurality of user profiles has said plurality of musical interests,
  wherein said plurality of musical interests are assigned to each said user profile of said plurality of user profiles based on said personal data of said respective user who owns said user profile,
  wherein each said user profile of said plurality of user profiles has said plurality of musical interests assigned thereto based on said personal data and said audio data within each said user profile of said plurality of user profiles,
  wherein said user interface allows said second user to choose said live stream associated with said respective user from a plurality of live streams associated with said plurality of user profiles, a processor operably connected to said first computing entity and said second computing entity, and a non-transitory computer-readable medium coupled to said processor, wherein said non-transitory computer-readable medium contains instructions stored thereon, which, when executed by said processor, cause said processor to perform operations comprising:
  receiving an audio selection from said first computing entity,
    wherein said audio selection is made by said respective user choosing audio data associated with said user profile and that is presented within said user interface,
  creating a live stream using said audio data and based on said audio selection,
    wherein said live stream mirrors said audio data that said first computing entity is currently playing,
  performing an evaluation of said plurality of musical interests of said plurality of user profiles compared to said plurality of musical interests of said second user profile,
  recommending said plurality of live streams to said second user based on said evaluation,
  transmitting said live stream over said network when said live stream is selected by said second user via said user interface,
    wherein said live stream is transmitted in a way such that said second user accesses said live stream via said user interface of said second computing entity in order to listen to said live stream,
  comparing musical interests of said second user to said musical interests of said respective user,
  determining if said respective user has a musical interest not associated with said second user,
  recommending said at least one music genre to said second user based on any differences between the musical interests of said respective user and the musical interests of said second user,
wherein said plurality of user profiles are contained within at least one of said non-transitory computer-readable medium and a database.

2. The system of claim 1, wherein search parameters restrict which said live stream of said plurality of live streams is recommended to said second user via said user interface.

3. The system of claim 2, wherein said processor compares said plurality of musical interests and said personal data of said plurality of user profiles to said plurality of musical interests and said personal data of said second user profile, wherein a minimum threshold of said search parameters determines an amount said plurality of musical interests and said personal data of each said user profile of said plurality of user profiles matches said plurality of musical interests and said personal data of said second user profile, wherein said plurality of live streams of said plurality of user profiles that meet said minimum threshold are presented via said user interface to said second user.

4. The system of claim 2, wherein said search parameters comprise at least a personal geolocation of said user, wherein said personal geolocation is associated with an activity of said user, wherein said plurality of live streams recommended to said user are at least partially based on said activity of said user.

5. The system of claim 1, wherein said personal data of said respective user is visualized within said user interface in a way such that said second user may select said personal data when viewing said user profile of said respective user, wherein said personal data of said respective user is associated with said audio data of said respective user in a way such that selecting said personal data of said respective user via said user interface causes said audio data of said respective user to be presented to said second user via said user interface.

6. The system of claim 1, wherein said user interface presents controls to said respective user, which may allow said respective user to control said audio data presented via said live stream.

7. The system of claim 1, wherein said user interface presents controls to said second user, which may allow said second user to control said audio data presented via said live stream.

8. The system of claim 1, wherein a plurality of users may create a group, wherein a group user of a plurality of group users may create a group live stream, wherein said group livestream contains audio data that is uniform for each said group user, wherein said plurality of group users may contribute said audio data to said group live stream.

9. The system of claim 1, further comprising a geolocation device, wherein geospatial data of said geolocation device is transmitted to said processor, wherein said processor uses said geospatial data to limit which said user profile of said plurality of user profiles are within said user interface.

10. A system for socially connecting two or more individuals and expanding musical interests of an individual, comprising:
  a database having a plurality of user profiles and connected to a network,
    wherein a user profile of said plurality of user profiles belongs to a user,
    wherein each said user profile of said plurality of user profiles comprises personal data and audio data,
    wherein said personal data comprises social activities of said user,
    wherein said social activities include at least one in-person musical event that said user will at least one of attend in-person or has already attended in-person,
    wherein said at least one in-person musical event is an event with a physical location and that is associated with at least one music genre,
    wherein said personal data within each said user profile of said plurality of user profiles is associated with said audio data of each said user profile of said plurality of user profiles,
  a computing entity having a user interface and connected to said network,
    wherein said user interface of said computing entity presents to said user said plurality of user profiles having a plurality of musical interests based on said audio data and said personal data,
    wherein each said user profile of said plurality of user profiles has said plurality of musical interests based on said audio data and said personal data,
    wherein said personal data is presented to said user interface via said user interface,
    wherein selection of said personal data via said user interface causes audio data that is associated with said personal data to be presented to said user via said computing entity,
  a processor operably connected to said database and said computing entity, and
  a non-transitory computer-readable medium coupled to said processor,
    wherein said non-transitory computer-readable medium contains said plurality of user profiles, wherein said non-transitory computer-readable medium contains instructions stored thereon, which, when executed by said processor, cause said processor to perform operations comprising:
receiving an input from said computing entity, wherein said input is associated with said personal data of said user profile,
determining whether said personal data of said user profile is associated with said audio data of said user profile,
retrieving said audio data of said user profile associated with said personal data that was selected within said user interface,
presenting said audio data to said user via said computing entity,
comparing said at least one music genre of said at least one in-person musical event of said user to said musical interests of said plurality of user profiles,
determining if said at least one in-person musical event of said plurality of user profiles is associated with one or more of said at least one music genre not also associated with said user,
recommending said at least one music genre of said at least one in-person musical event of said plurality of user profiles that is not also associated with said user to said user.

11. The system of claim 10, wherein search parameters restrict which said user profile of said plurality of user profiles is recommended to said user via said user interface.

12. The system of claim 11, wherein said processor compares said plurality of musical interests and said personal data of said plurality of user profiles to said plurality of musical interests and said personal data of said user profile of said user, wherein a minimum threshold of said search parameters determines an amount said plurality of musical interests and said personal data of each said user profile of said plurality of user profiles matches said plurality of musical interests and said personal data of said user profile of said user, wherein each said user profile of said plurality of user profiles that meets said minimum threshold are presented via said user interface.

13. The system of claim 11, wherein said search parameters comprise at least a personal geolocation of said user, wherein said personal geolocation is associated with an activity of said user, wherein said plurality of live streams recommended to said user are at least partially based on said activity of said user.

14. The system of claim 10, wherein said user interface presents controls to said user, which may allow said user to control said audio data presented via a live stream of said user profile of said plurality of user profiles.

15. The system of claim 10, wherein a plurality of users may create a group, wherein a group user of a plurality of group users may create a group live stream, wherein said group livestream contains said audio data that is uniform for each said group user, wherein said plurality of group users may contribute said audio data to said group live stream.

16. The system of claim 10, further comprising a geolocation device, wherein geospatial data of said geolocation device is transmitted to said processor, wherein said processor uses said geospatial data to limit which said user profile of said plurality of user profiles is presented via said user interface.

17. A system for socially connecting two or more individuals and expanding musical interests of an individual, comprising:

a database having a plurality of user profiles and connected to a network,
wherein a user profile of said plurality of user profiles comprises personal data and audio data,
wherein said personal data comprises social activities of a user associated with said user profile,
wherein said social activities include at least one in-person musical event that said user will at least one of attend in-person or has already attended in-person,
wherein said at least one in-person musical event is an event with a physical location and that is associated with at least one music genre,
wherein said personal data within each said user profile of said plurality of user profiles is associated with said audio data of each said user profile of said plurality of user profiles,
wherein a plurality of musical interests are created for each said user profile of said plurality of user profiles using said personal data and said audio data,
a computing entity having a user interface and connected to said network,
wherein a geolocation device of said computing entity collects geospatial data,
wherein said user interface presents said plurality of user profiles via a display of said computing entity,
wherein each said user profile that is presented within said user interface is limited to a determined geographic range of said computing entity,
wherein each said user profile that is presented within said user interface is limited to those that have a musical interest of said plurality of musical interests that matches a chosen musical interest,
wherein said personal data is visualized within said user interface,
a processor operably connected to said database and said computing entity, and
a non-transitory computer-readable medium coupled to said processor,
wherein said non-transitory computer-readable medium contains said plurality of user profiles,
wherein said non-transitory computer-readable medium contains instructions stored thereon, which, when executed by said processor, cause said processor to perform operations comprising:
receiving said geospatial data from said geolocation device,
determining whether each said user profile of said plurality of user profiles is within said determined geographic range,
determining whether said musical interest of each said user profile of said plurality of user profiles matches said chosen musical interest,
presenting each said user profile that is within said determined geographic range and that matches said chosen musical interest within said user interface,
comparing musical interests of said user to said musical interests of said plurality of user profiles,
determining if said plurality of user profiles have said musical interests not associated with said user,
recommending said at least one music genre to said user based on any differences between the musical interests of said respective user and the musical interests of said plurality of user profiles, comparing said at least one music genre of said at least one in-person musical event of said user to said musical interests of said plurality of user profiles, determining if said at least one in-person musical event of said plurality of user profiles is associated with one or more of said at least one music genre not also associated with said user, and recommending said at least one music genre of said at least one in-person musical event of said plurality of user profiles that is not also associated with said user to said user.

18. The system of claim 17, wherein said user interface presents controls to said user, which allow said user to control said audio data presented via a live stream of said user profile.

19. The system of claim 17, wherein a plurality of users may create a group, wherein a group user of a plurality of group users may create a group live stream, wherein said group livestream contains said audio data that is uniform for each said group user, wherein said plurality of group users may contribute said audio data to said group live stream.

\* \* \* \* \*